United States Patent
O'Day

(10) Patent No.: US 9,742,264 B2
(45) Date of Patent: Aug. 22, 2017

(54) BOOST INDUCTOR DEMAGNETIZATION DETECTION FOR BRIDGELESS BOOST PFC CONVERTER OPERATING IN BOUNDARY-CONDUCTION MODE

(71) Applicant: Murata Manufacturing Co., Ltd., Nagaokakyo-shi, Kyoto-fu (JP)

(72) Inventor: James O'Day, Broomfield, CO (US)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/337,497

(22) Filed: Jul. 22, 2014

(65) Prior Publication Data

US 2016/0028304 A1    Jan. 28, 2016

(51) Int. Cl.
*H02M 1/42* (2007.01)
*H02M 1/00* (2006.01)
*H02M 3/158* (2006.01)

(52) U.S. Cl.
CPC ....... *H02M 1/4233* (2013.01); *H02M 1/4225* (2013.01); *H02M 1/42* (2013.01); *H02M 1/425* (2013.01); *H02M 1/4258* (2013.01); *H02M 3/1584* (2013.01); *H02M 2001/0009* (2013.01); *Y02B 70/126* (2013.01); *Y02P 80/112* (2015.11)

(58) Field of Classification Search
CPC ...... H02M 1/42; H02M 1/4208; H02M 1/425; H02M 1/4258; H02M 2001/0009
See application file for complete search history.

(56) References Cited

U.S. PATENT DOCUMENTS

| | | | |
|---|---|---|---|
| 7,630,221 B2* | 12/2009 | Sui | G05F 1/70 323/207 |
| 2010/0259957 A1* | 10/2010 | Jin | H02M 1/4208 363/126 |
| 2013/0207621 A1 | 8/2013 | Nishibori et al. | |
| 2014/0035541 A1 | 2/2014 | Jin et al. | |
| 2014/0056045 A1* | 2/2014 | Yan | H02M 1/4233 363/126 |
| 2014/0085949 A1* | 3/2014 | Sugawara | H02M 1/4225 363/89 |
| 2015/0280547 A1 | 10/2015 | Pu et al. | |

FOREIGN PATENT DOCUMENTS

| | | |
|---|---|---|
| CN | 101552546 A | 10/2009 |
| CN | 102843025 A | 12/2012 |
| CN | 103809007 A | 5/2014 |

OTHER PUBLICATIONS

Official Communication issued in corresponding Chinese Patent Application No. 201510427550.6, dated Jun. 1, 2017.

* cited by examiner

*Primary Examiner* — Fred E Finch, III
*Assistant Examiner* — Rafael O De Leon Domenech
(74) *Attorney, Agent, or Firm* — Keating & Bennett, LLP

(57) ABSTRACT

A bridgeless converter includes a boost inductor connected in series with an alternating-current power source, a first series circuit including a first switching device and a second switching device connected in series with each other, a second series circuit including a third switching device and a fourth switching device connected in series with each other, a capacitor connected in parallel with the first series circuit and the second series circuit, and a magnetization sensing circuit including at least one auxiliary winding inductively coupled to the boost inductor.

17 Claims, 9 Drawing Sheets

BOOST INDUCTOR DEMAGNETIZATION DETECTION FOR BRIDGELESS BOOST PFC CONVERTER OPERATING IN BOUNDARY-CONDUCTION MODE

BACKGROUND OF THE INVENTION

1. Field of the Invention

The present invention relates to circuits for power conversion. More specifically, the present invention relates to control circuits for bridgeless boost power converters with power factor correction (PFC).

2. Description of the Related Art

A conventional PFC converter includes a diode bridge that provides full-wave rectification of an alternating-current input voltage such that the power-conversion circuitry of the conventional PFC converter always receives a positive-polarity input voltage. The power-conversion circuitry typically includes a boost inductor with an auxiliary winding that is used for demagnetization sensing. The auxiliary winding is coupled to a detection circuit that includes an analog comparator or an integrated circuit (IC) device.

Commonly used operation modes for a conventional boost converter include a continuous-conduction mode and a boundary-conduction mode. In the continuous-conduction mode, the current through a boost inductor of the boost converter is continuous. In the boundary-conduction mode, a switch included in the boost converter turns on when the current through the boost inductor reaches zero, which is a boundary between the continuous-conduction mode and a discontinuous-conduction mode. In the discontinuous-conduction mode, the current through the boost inductor reaches and remains at zero for a winding reset time period, which results in a "dead zone." Accordingly, at the critical point when the current through the boost inductor reaches zero, a boost converter operating in the boundary-condition mode turns on the switch to avoid the "dead zone." A boost converter that operates in the boundary-conduction mode eliminates the need for a fast-recovery diode that is required by a boost converter that operates in the continuous-conduction mode. Further, the switch of the boost converter is able to turn on with zero or substantially zero current in the boundary-conduction mode, which reduces switching loss in the boost converter.

A bridgeless PFC converter relies upon diodes and switches included within the switching circuitry of the bridgeless PFC converter to rectify an alternating-current input voltage. Because bridgeless PFC converters cause the input voltage to the power conversion circuitry of the PFC converter to alternate between positive and negative polarity every half-cycle of the alternating-current input voltage, conventional demagnetization-sensing circuits are generally unusable with bridgeless PFC converters. More specifically, conventional demagnetization-sensing circuits use diodes to couple the auxiliary winding of the boost inductor to the sensing circuit so that the demagnetization pulses are sent to the sensing circuit, and this diode coupling only permits a single polarity to be detected by the sensing circuit.

Accordingly, a demagnetization-sensing for a bridgeless PFC converter requires special design considerations so that demagnetization pulses of both positive and negative polarity are able to be detected. FIG. 1 shows a conventional bridgeless PFC converter 10 with a demagnetization-sensing circuit.

As shown in FIG. 1, the bridgeless PFC converter 10 includes an alternating-current power supply AC that is connected in series with a boost inductor L1. The bridgeless PFC converter 10 also includes a first transistor Q1 and a second transistor Q2 that are connected in series with each other in a totem-pole configuration, as well as a first diode D1 and a second diode D2 that are connected in series with each other. The first and second transistors Q1 and Q2 are connected in parallel with a capacitor C1. The capacitor C1 is an energy-storage bulk capacitor, and the voltage at capacitor C1 provides the direct-current output DC of the bridgeless PFC converter 10. The bridgeless PFC converter 10 may also include current-sense transformers CS1 and CS2 in series with the first and second transistors Q1 and Q2 to detect the current flowing through the first and second transistors Q1 and Q2.

The boost inductor L1 and the alternating-current power supply AC are, respectively, connected to a point between the first and second transistors Q1 and Q2 and a point between the first and second diodes D1 and D2. This arrangement allows the PFC converter 10 to operate as a bridgeless PFC converter, since the alternating-current power supply AC is rectified by the first and second transistors Q1 and Q2 and the first and second diodes D1 and D2 so that a positive voltage is always applied to the capacitor C1 at the direct-current output DC. Particularly, when the alternating-current power supply AC outputs a positive voltage, the second transistor Q2 and second diode D2 conduct to provide a charging current to the boost inductor L1, and the first transistor Q1 and the second diode D2 conduct to provide a discharging current from the boost inductor L1 to the capacitor C1. However, when the alternating-current power supply AC outputs a negative voltage, the first transistor Q1 and first diode D1 conduct to provide a charging current to the boost inductor L1, and the second transistor Q2 and the first diode D1 conduct to provide a discharging current from the boost inductor L1 to the capacitor C1. During the half-cycle when the alternating-current power supply AC outputs a negative voltage, the negative voltage of the alternating-current power supply AC is transformed to a positive voltage and supplied to the direct-current output DC.

To perform boost conversion in the PFC converter 10, it is necessary to properly control the on-off operation of the first and second transistors Q1 and Q2 so that the PFC converter 10 operates in a boundary-conduction mode. Particularly, the first and second transistors Q1 and Q2 are controlled based upon the on-time determined by a control device 11 and the magnetization state of the boost inductor L1 to obtain the desired boundary-conduction-mode operation and to obtain the desired output voltage and input current characteristics.

As shown in FIG. 1, the demagnetization-sensing circuit of the bridgeless PFC converter 10 includes a sense resistor R1, a differential amplifier 12, an isolation device ISO, and the control device 11. The sense resistor R1 is arranged in series between the alternating-current power supply AC and the boost inductor L1. A voltage drop across the sense resistor R1 is detected by the differential amplifier 12, and a signal output from the differential amplifier 12 is received by the control device 11 via the isolation device ISO. As shown in FIG. 1, the isolation device ISO may be a transformer. According to the voltage across the sense resistor R1, the control device 11 is able to detect when the boost inductor L1 becomes demagnetized by determining a zero crossing of the current in the boost inductor L1. More specifically, the control device 11 is able to detect when the current flowing through the sense resistor R1 changes from a positive current to a negative current, or when the current flowing through the sense resistor R1 changes from a negative current to a positive current.

A magnetization state of the boost inductor L1 changes according to the current flowing through the boost inductor L1. When a boost switch of the PFC converter 10 is turned on, current flows through the boost inductor L1 from the alternating-current power supply AC, generating a magnetic field and magnetizing the boost inductor L1. After the boost inductor L1 is magnetized, the boost switch is turned off and the freewheel switch is turned on to connect the boost inductor L1 to the direct-current output DC. Then, the freewheel switch is turned off, and the boost inductor L1 demagnetizes. Based upon the magnetization state of the boost inductor L1, the control device 11 outputs signals that control the on-off operation of the first and second transistors Q1 and Q2 to maintain boundary-conduction-mode operation of the PFC converter 10. More specifically, the control device 11 determines a time delay after which a boost switch is turned on to initiate a switching half-cycle. The time delay may either be computed by the control device 11, or the control device 11 may determine the time delay from a lookup table based on information including, for example, input voltage, output voltage, and load conditions.

The boost switch changes between the first transistor Q1 and the second transistor Q2 every half-cycle of the alternating-current power supply AC. That is, during the half-cycle when the alternating-current power supply AC outputs a positive voltage, the second transistor Q2 operates as the boost switch and the first transistor Q1 operates as a freewheel switch according to the on-off control signals output by the control device 11. Conversely, during the half-cycle when the alternating-current power supply AC outputs a negative voltage, the first transistor Q1 operates as the boost switch and the second transistor Q2 operates as the freewheel switch according to the on-off control signals output by the control device 11.

However, since the magnetization state of the boost inductor L1 is detected according to the voltage across the sense resistor R1, the demagnetization-sensing circuit used with the bridgeless PFC converter 10 shown in FIG. 1 reduces the efficiency of the bridgeless PFC converter 10. Specifically, the sense resistor R1 is a dissipative element that renders the demagnetization-sensing circuit unusable in high-efficiency applications or in bridgeless PFC converters that operate at high voltages.

SUMMARY OF THE INVENTION

Preferred embodiments of the present invention provide a bridgeless PFC converter with demagnetization sensing that does not include a sense resistor in series with a boost inductor.

According to a preferred embodiment of the present invention, a bridgeless converter includes a boost inductor connected in series with an alternating-current power source, a first series circuit including a first switching device and a second switching device connected in series with each other, a second series circuit including a third switching device and a fourth switching device connected in series with each other, a capacitor connected in parallel with the first series circuit and the second series circuit, and a magnetization sensing circuit including at least one auxiliary winding inductively coupled to the boost inductor.

The at least one auxiliary winding preferably includes a first auxiliary winding and a second auxiliary winding, and the first auxiliary winding and the second auxiliary winding are preferably connected in series with each other. Preferably, a first resistor and a second resistor are connected in series with each other and arranged between the first and second auxiliary windings. Preferably, a voltage comparator including a first input is connected to a point between the first and second resistors and a second input connected to a reference voltage, and the reference voltage is preferably ground. A control device is preferably connected to an output of the voltage comparator, and the control device preferably controls the first switching device and the second switching device according to the output of the voltage comparator.

The boost inductor is preferably connected to the first series circuit at a point between the first and second switching devices. The alternating-current power source is preferably connected to the second series circuit at a point between the third and fourth switching devices. Each of the first switching device and the second switching device is preferably a field effect transistor. Each of the third switching device and the fourth switching device is preferably a diode or a field effect transistor.

Preferably, a first current-sense transformer is arranged to sense current in the first switching device, and a second current-sense transformer is arranged to sense current in the second switching device. Preferably, a comparator circuit includes a first input selectively connected to the first and second current-sense transformers and a second input connected to a reference voltage. The first current-sense transformer is preferably connected to the comparator circuit when the first switching device is in an ON state, and the second current-sense transformer is preferably connected to the comparator circuit when the second switching device is in an ON state. A control device is preferably connected to an output of the comparator circuit. The control device preferably controls the first switching device and the second switching device according to an output of the first and second current sense transformers. Preferably, a sense resistor is connected between the first input of the comparator circuit and ground.

A magnetization sensing circuit for an inductor of a voltage converter according to a preferred embodiment of the present invention includes at least one winding that is inductively coupled to the inductor of the voltage converter and a voltage comparator including a first input connected to the at least one winding and a second input connected to a reference voltage. An output of the voltage comparator is a signal that indicates a magnetization state of the inductor of the voltage converter.

Preferably, a control device is connected to an output of the voltage comparator. The at least one winding preferably includes a first winding and a second winding, with a first switch preferably connected to the first winding and a second switch preferably connected to the second winding. Preferably, an input of the voltage converter is an alternating-current power supply, and the first and second switches turn on and off in an alternating and complementary manner, according to zero crossings of the alternating-current power supply. The reference voltage is preferably ground.

A method for controlling a bridgeless converter according to a preferred embodiment of the present invention includes detecting a current through a boost switch and a freewheel switch of the bridgeless converter, turning off the freewheel switch when the detected current reaches zero, determining a time delay according to at least one operating condition of the bridgeless converter, and turning on the boost switch after the time delay has elapsed.

The time delay is preferably determined in real time. Preferably, the time delay is determined from a look-up table. The operating condition preferably includes at least one of an input voltage at an input of the bridgeless converter, an output voltage at an output of the bridgeless converter, a condition of a load at the output of the bridgeless converter, a condition of an input line connected to the input of the bridgeless converter, a condition of a line connected to the input or the output of the bridgeless converter, and a predetermined ideal timing for an input or output of the bridgeless converter.

The above and other features, elements, steps, configurations, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will now be described in detail with reference to FIGS. 2A to 7B. Note that the following description is in all aspects illustrative and not restrictive and should not be construed to restrict the applications or uses of the present invention in any manner.

Figure 1:
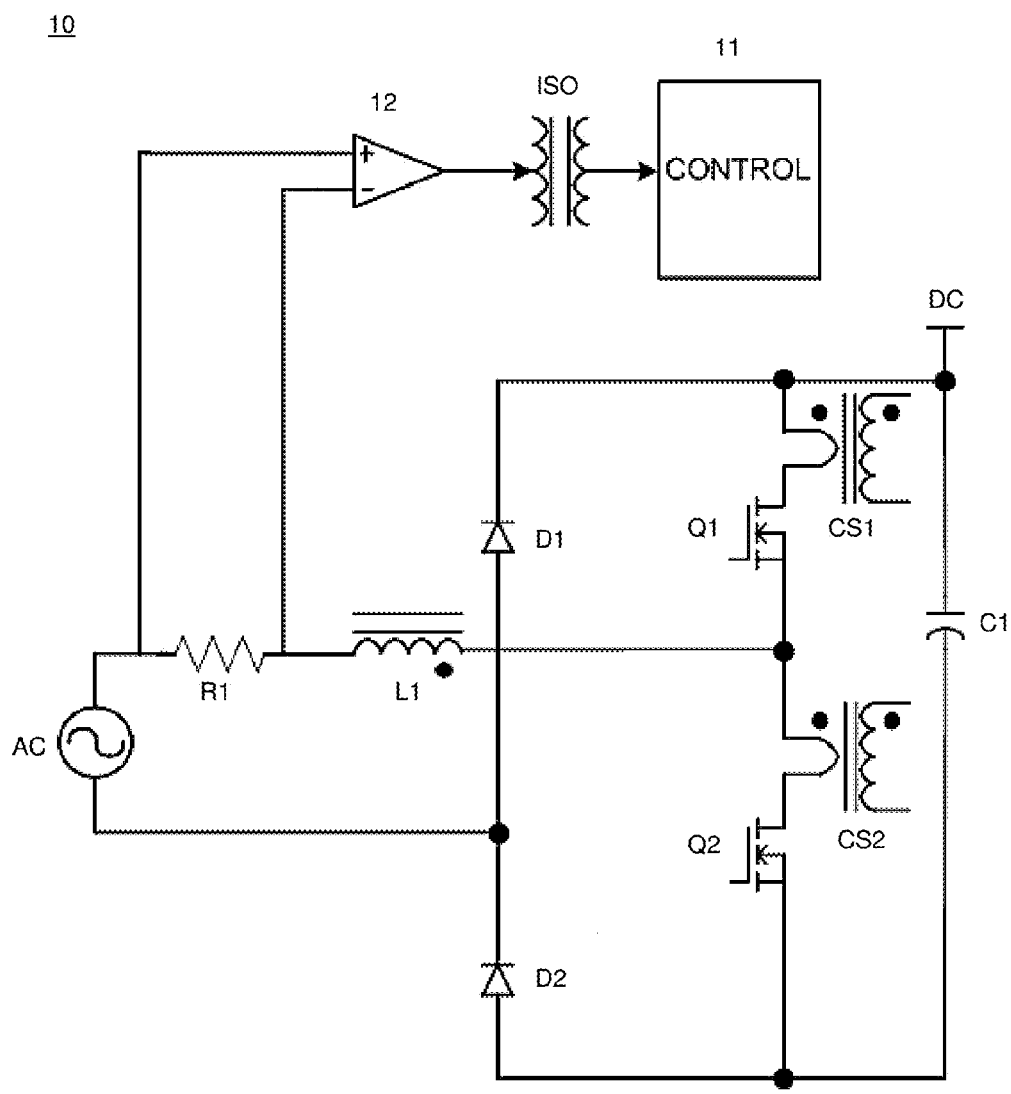
FIG. 1 is a circuit diagram of a conventional bridgeless PFC converter including a demagnetization-sensing circuit.
Figure 2A:
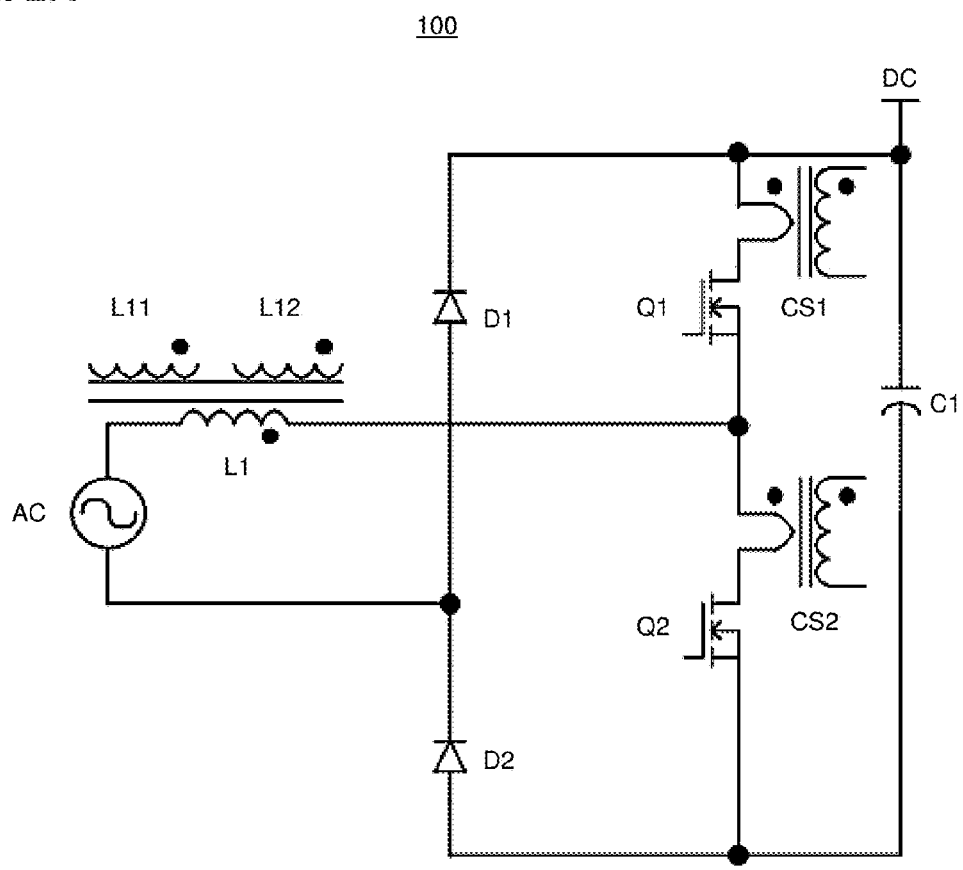
FIG. 2A is a circuit diagram of a bridgeless PFC converter according to a first preferred embodiment of the present invention.

FIG. 2A shows a bridgeless PFC converter 100 in accordance with a first preferred embodiment of the present invention.

As shown in FIG. 2A, the bridgeless PFC converter 100 includes an alternating-current power supply AC that is connected in series with a boost inductor L1. The bridgeless PFC converter 100 also includes a first transistor Q1 and a second transistor Q2 that are connected in series with each other in a totem-pole configuration, as well as a first diode D1 and a second diode D2 that are connected in series with each other. The first and second transistors Q1 and Q2 are connected in parallel with a capacitor C1. The capacitor C1 is an energy-storage bulk capacitor, and the voltage at the capacitor C1 provides the direct-current output DC for the bridgeless PFC converter 100. Preferably, the capacitor C1 is polarized and rated according to the desired ripple current and the desired voltage of the direct-current output DC. The capacitance of the capacitor C1 is preferably selected according to desired output hold-up requirements. The bridgeless PFC converter 10 preferably includes current-sense transformers CS1 and CS2 that have primary windings in series with the first and second transistors Q1 and Q2. As described below, the current-sense transformers CS1 and CS2 preferably couple the bridgeless PFC converter 100 to a current-sensing circuit 120 shown in FIG. 4 that detects the current flowing through the first and second transistors Q1 and Q2.

The boost inductor L1 and the alternating-current power supply AC are, respectively, connected to a point between the first and second transistors Q1 and Q2 and a point between the first and second diodes D1 and D2.

To provide boost conversion in the PFC converter 100, the on-off operation of the first and second transistors Q1 and Q2 are controlled so that the PFC converter 100 operates in boundary-conduction mode. Particularly, the first and second transistors Q1 and Q2 are switched based upon the on-time as determined by a controller or control device and the magnetization state of the boost inductor L1 to obtain the desired boundary-conduction-mode operation and the desired voltage at the direct-current output DC. The on-off operation and control of the first and second transistors Q1 and Q2 is further described with respect to FIG. 5.

The boost switch changes between the first transistor Q1 and the second transistor Q2 with every half-cycle of the alternating-current power supply AC. That is, during the half-cycle when the alternating-current power supply AC outputs a positive voltage, the second transistor Q2 operates as the boost switch, and the first transistor Q1 operates as the freewheel switch. Conversely, during the half-cycle when the alternating-current power supply AC outputs a negative voltage, the first transistor Q1 operates as the boost switch, and the second transistor Q2 operates as the freewheel switch. Only one of the boost switch and the freewheel switch is on at any given time. Moreover, there is preferably a short delay between the freewheel switch turning off and the boost switch turning on, as further described with respect to FIG. 5.

According to a preferred embodiment of the present invention, the first and second transistors Q1 and Q2 each include body diodes that are biased in the same direction as the first and second diodes D1 and D2. The body diodes of the first and second transistors Q1 and Q2 carry current until the first and second transistors Q1 and Q2 are turned on. Preferably, the first and second transistors Q1 and Q2 are MOSFETs. According to other preferred embodiments of the present invention, the first and second transistors Q1 and Q2 are preferably GaN (gallium nitride) transistors, IGBT's (insulated-gate bipolar transistor), silicon carbide transistors, bipolar transistors, and the like, depending on the specific application, power level, output voltage, input voltage, operating frequencies, etc. The first and second transistors Q1 and Q2 are preferably selected according to their dynamic characteristics and to provide a low conduction loss.

According to another preferred embodiment of the present invention, if a transistor that does not include a body diode is used for one or both of the first and second transistors Q1 and Q2, a diode is arranged in parallel with the transistor.

Figure 2B:
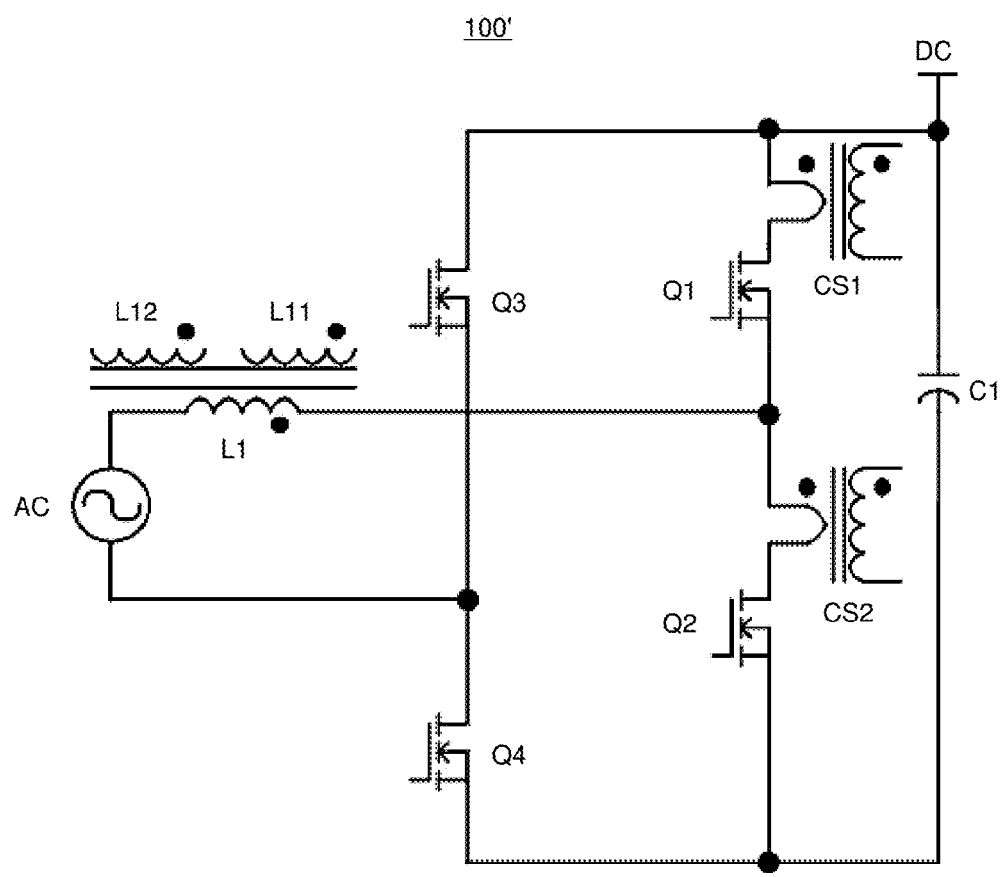
FIG. 2B is a circuit diagram of a modification of the bridgeless PFC converter shown in FIG. 2A.

FIG. 2B is a circuit diagram of a modified bridgeless PFC converter 100'. According to a preferred embodiment of the present invention, the bridgeless PFC converter 100 shown in FIG. 2A may be modified such that the first and second diodes D1 and D2 are replaced by, respectively, a third transistor Q3 and a fourth transistor Q4, as shown in FIG.

2B. Because the third and fourth transistors Q3 and Q4 have a lower conducting voltage drop than the first and second diodes D1 and D2, efficiency is increased. However, additional control circuitry is required to control the on and off operation of the third and fourth transistors Q3 and Q4.

Preferably, the third and fourth transistors Q3 and Q4 are MOSFETs that have low RDSon values. That is, the third and fourth transistors Q3 and Q4 preferably have a low resistance when they operate in saturation, which provides conduction losses lower than those of the first and second diodes D1 and D2, thereby increasing efficiency in the modified bridgeless PFC converter 100'. Furthermore, because the third and fourth transistors Q3 and Q4 are switched on and off at the frequency of the alternating-current power supply AC, dynamic losses in the third and fourth transistors Q3 and Q4 do not substantially affect the operation of the modified bridgeless PFC converter 100'. In accordance with another preferred embodiment of the present invention, the third and fourth transistors Q3 and Q4 permit the modified bridgeless PFC converter 100' to operate in the reverse direction to the convert a direct-current input voltage into an alternating-current output voltage, thereby providing a bi-directional converter.

Figure 3:
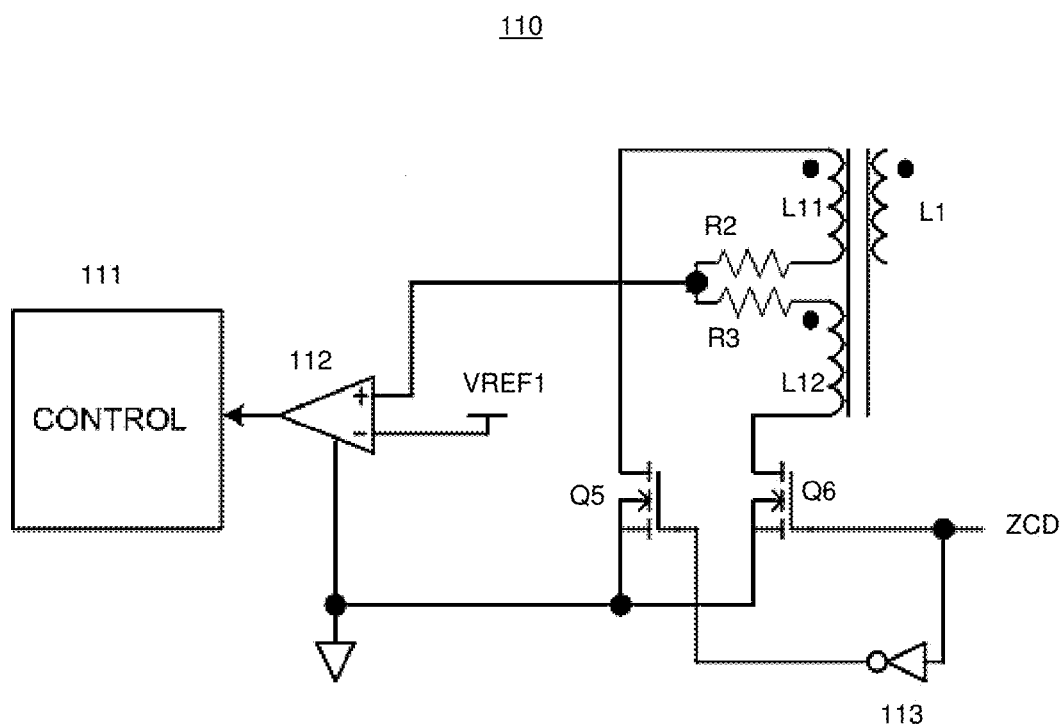
FIG. 3 is a circuit diagram of a demagnetization-sensing circuit for the bridgeless PFC converter shown in FIG. 2A.

FIG. 3 is a circuit diagram of a demagnetization-sensing circuit 110 for the bridgeless PFC converter 100 shown in FIG. 2A.

As shown in FIG. 3, the demagnetization-sensing circuit 110 includes resistors R2 and R3, a comparator circuit 112, a control device 111, and a transformer including the boost inductor L1 and first and second auxiliary windings L11 and L12. The demagnetization-sensing circuit 110 also includes a zero-crossing reference signal ZCD and a reference voltage VREF1 that is input to a negative terminal of the comparator circuit 112. Preferably, the reference voltage VREF1 is ground or is determined according to the voltages that are generated at the first and second auxiliary windings L11 and L12, such as between about 100 mV and about 200 mV to be within the common-mode range of the comparator circuit 112. The reference voltage VREF1 may be provided, for example, by a resistive divider connected to a stable voltage source (e.g., a voltage source with an output that does not vary more than +/−5%). The zero-crossing reference signal ZCD is provided as a control signal for transistors Q5 and Q6, which form a differential pair due to a NOT gate 113 being connected between the zero-crossing reference signal ZCD and a control terminal of the transistor Q5. The zero-crossing reference signal ZCD is preferably a square wave or a substantially square wave that is synchronized with the zero crossing of the alternating-current power supply AC. Preferably, the zero-crossing reference signal ZCD is provided by another circuit (not shown) that senses the zero crossing of the alternating-current power supply AC.

Thus, when the alternating-current power supply AC outputs a positive voltage, the zero-crossing reference signal ZCD provides a positive voltage input to the demagnetization-sensing circuit 110 that turns on the transistor Q6 and connects the second auxiliary winding L12 to ground. However, when the alternating-current power supply AC outputs a negative voltage, the zero-crossing reference signal ZCD provides a negative voltage input to the demagnetization-sensing circuit 110 that, after passing through the NOT gate 113, turns on the transistor Q5 and connects the first auxiliary winding L11 to ground.

Accordingly, the first and second auxiliary windings L11 and L12, are connected to ground in an alternating manner so that a demagnetization pulse is provided to a positive terminal of the comparator circuit 112 regardless of the polarity of the voltage of the alternating-current power supply AC.

As shown in FIG. 3, the demagnetization-sensing circuit 110 preferably includes resistors R2 and R3 arranged between the first and second auxiliary windings L11 and L12 such that a point between the resistors R2 and R3 provides an input signal for the positive terminal of the comparator circuit 112. The resistors R2 and R3 limit the current input to the comparator circuit 112 when the boost switch is on during a charging interval of the boost inductor L1. When the boost inductor L1 is charging, one end of the first and second auxiliary windings L11 and L12 is connected to ground through the respective one of the fifth and sixth transistors Q5 and Q6, depending on the polarity of the AC input source. Preferably, the resistors R2 and R3 each have a large resistance to limit their power dissipation. The resistance of the resistors R2 and R3 is preferably selected so that the time constant formed between the resistors R2 and R3 and any parasitic capacitive elements of the first and second auxiliary windings L11 or L12 does not introduce an additional delay in the sensing circuit. According to another preferred embodiment of the present invention, the resistors R2 and R3 are instead connected in series, respectively, with the fifth and sixth transistors Q5 and Q6, thereby allowing the first and second auxiliary windings L11 or L12 to either be directly connected or formed as a single auxiliary winding with a center tap.

A signal output from the comparator circuit 112, which is based upon the demagnetization pulse provided from the first and second auxiliary windings L11 and L12, is received by the control device 111. According to the signal output by the comparator circuit 112, the control device 111 is able to detect when the boost inductor L1 is about to become demagnetized by measuring the voltage across the first and second auxiliary windings L11 and L12. More specifically, at the end of the freewheel period when the current in the boost inductor L1 falls to zero, the voltage across the boost inductor L1 rings to nearly the instantaneous voltage of alternating-current power supply AC. This change in the voltage of the boost inductor L1 induces a corresponding change in the voltage of the first and second auxiliary windings L11 and L12. Depending on the polarity of the alternating-current power supply AC, the voltage on either the first or second auxiliary winding L11 or L12 is sensed by comparator circuit 112 and control device 111. The voltage change on the boost inductor L1 occurs as soon as the inductor current falls to zero. The control device 111 controls the on timing of the boost switch in the totem-pole configuration of the first and second transistors Q1 and Q2 according to the signal output from the comparator circuit 112.

As described above, the boost switch changes between the first transistor Q1 and the second transistor Q2 every half-cycle of the alternating-current power supply AC.

Figure 4:
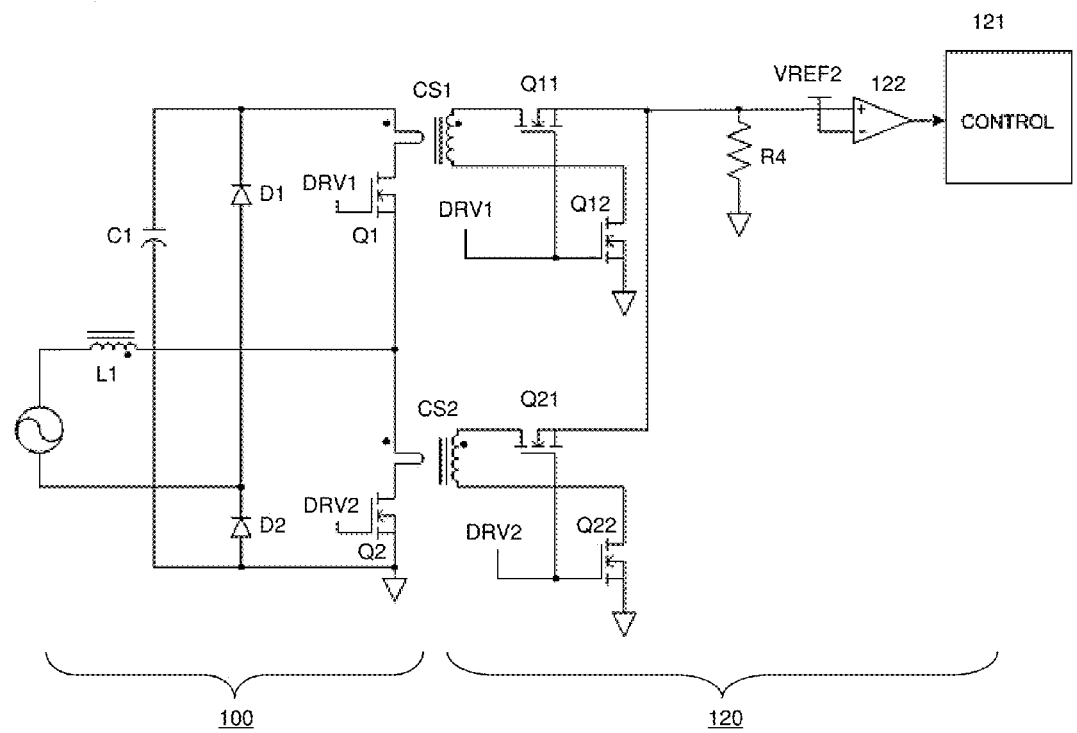
FIG. 4 is a circuit diagram of a current-sensing circuit for the bridgeless PFC converter shown in FIG. 2A.

FIG. 4 is a circuit diagram of the current-sensing circuit 120 coupled to the bridgeless PFC converter 100 shown in FIG. 2A.

As shown in FIG. 4, the current-sensing circuit 120 includes a pair of first transistors Q11 and Q12, a pair of second transistors Q21 and Q22, a resistor R4, a comparator 122, and a control device 121 The pair of first transistors Q11 and Q12 are driven in phase with the first transistor Q1, and the pair of second transistors Q21 and Q22 are driven in phase with the second transistor Q2. The pair of first transistors Q11 and Q12 decouple the resistor R4 from the secondary winding of the current-sense transformer CS1 during the off time of the first transistor Q1 and the pair of second transistors Q21 and Q22 decouple the resistor R4 from the secondary winding of the current-sense transformer CS2 during the off time of the second transistor Q2. The resistor R4 is decoupled from the secondary windings of the current-sense transformers CS1 and CS2 so that the current-sense transformers CS1 and CS2 can develop a sufficient volt-time product to reset. Preferably, the pair of first transistors Q11 and Q12 and the pair of second transistors Q21 and Q22 are MOSFETs. A pair of transistors (i.e., the pair of first transistors Q11 and Q12 and the pair of second transistors Q21 and Q22) is needed for each of the current-sense transformers CS1 and CS2 due to the inherent body diodes present in MOSFETs. Preferably, the pair of first transistors Q11 and Q12 and the pair of second transistors Q21 and Q22 are arranged such that they block current in either direction when driven in the off state. The current-sensing circuit 120 also includes a reference voltage VREF2 that is input to the negative terminal of the comparator 122. The current-sensing circuit 120 is coupled to the bridgeless PFC converter 100 by the current-sense transformers CS1 and CS2. As shown in FIGS. 2A, 2B, and 4, the current-sense transformers CS1 and CS2 preferably include primary windings in series with the first and second transistors Q1 and Q2 of the bridgeless PFC converter 100 and include secondary windings that are connected to, respectively, the pair of first transistors Q11 and Q12 and the pair of second transistors Q21 and Q22 of the current-sensing circuit 120. Accordingly, the current-sensing circuit 120 detects the current flowing through the first and second transistors Q1 and Q2 via the current-sense transformers CS1 and CS2.

As shown in FIG. 4, the pair of first transistors Q11 and Q12 of the current-sensing circuit 120 is preferably driven to turn on and off by the same drive signal DRV1 that controls the first transistor Q1 of the bridgeless PFC converter 100. Further, the pair of second transistors Q21 and Q22 of the current-sensing circuit 120 is preferably driven to turn on and off by the same drive signal DRV2 that controls the second transistor Q2 of the bridgeless PFC converter 100.

As shown in FIG. 4, the current-sensing circuit 120 preferably includes the resistor R4 arranged between a positive terminal of the comparator 122 and ground. The output of current-sense transformers CS1 and CS2 is a current, which corresponds to the current in the first and second transistors Q1 and Q2, respectively. The resistor R4 transforms this current to a voltage which is sensed by comparator 122. Preferably, the resistor R4 has a relatively low resistance.

Preferably, the reference voltage VREF2 provides a direct-current reference voltage to the negative terminal of the comparator 122. Preferably, the reference voltage VREF1 is ground or is determined according to the voltages that are generated at the current-sense transformers CS1 and CS2, such as between about 100 mV and about 200 mV to be within the common-mode range of the comparator 122. According to various preferred embodiments of the present invention, the reference voltage VREF2 may be provided by, for example, an external circuit, a voltage divider connected to a direct-current power supply, a connection to ground, etc.

Preferably, the pair of first transistors Q11 and Q12 and the pair of second transistors Q21 and Q22 are small-signal transistors, for example, small-signal MOSFETs.

According to a preferred embodiment of the present invention, the control device 111 shown in FIG. 3 and the control device 121 shown in FIG. 4 are the same control device or are sub-devices of the same control device. For example, the control devices 111 and 121 may both be modules, sub-circuits, elements, or processes included within a processor, such as a digital signal processor (DSP), or within a controller, such as an analog controller.

The current-sensing circuit 120 shown in FIG. 4 can also be coupled to the modified bridgeless PFC converter 100' shown in FIG. 2B. As shown in FIGS. 2B and 4, the modified bridgeless PFC converter 100' couples to the current-sensing circuit 120 via the first and second current-sense transformers CS1 and CS2, as described above.

Figure 5:
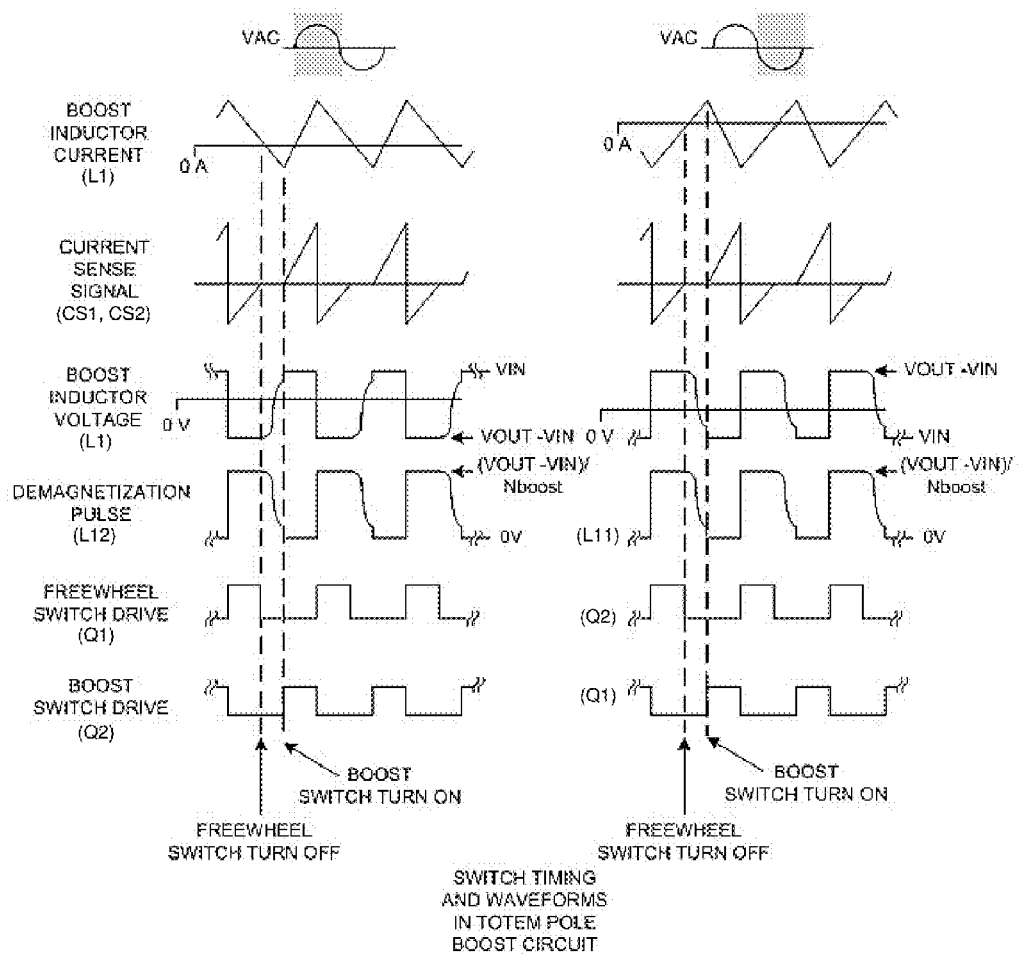
FIG. 5 shows waveforms associated with the bridgeless PFC converter shown in FIG. 2A, the demagnetization-sensing circuit shown in FIG. 3, and the current-sensing circuit shown in FIG. 4 in accordance with the first preferred embodiment of the present invention.

FIG. 5 shows waveforms associated with the bridgeless PFC converter 100 shown in FIG. 2A, the demagnetization-sensing circuit 110 shown in FIG. 3, and the current-sensing circuit 120 shown in FIG. 4 in accordance with the first preferred embodiment of the present invention.

The first column of FIG. 5 shows waveforms associated with a positive half-cycle of the input voltage provided by the alternating-current power supply AC, and the second column of FIG. 5 shows waveforms associated with a negative half-cycle of the input voltage provided by the alternating-current power supply AC. As shown in the first column of FIG. 5, the first transistor Q1 operates as the freewheel switch and the second transistor Q2 operates as the boost switch when the alternating-current power supply AC provides a positive voltage. However, as shown in the second column of FIG. 5, the second transistor Q2 operates as the freewheel switch and the first transistor Q1 operates as the boost switch when the alternating-current power supply AC provides a negative voltage.

As shown in the first column of FIG. 5, when the freewheel switch is on (i.e., when the first transistor Q1 is on), the current of the boost inductor L1 drops while the voltage of the boost inductor L1 remains substantially constant at a voltage that is equal to the difference between the output voltage VOUT of the direct-current output DC and the magnitude of the input voltage VIN of the alternating-current power supply AC. The voltage of the boost inductor L1 induces a corresponding voltage, having an opposite polarity, in one of the first and second auxiliary windings L11 and L12. The voltage induced in the first and second auxiliary windings L11 and L12 is the demagnetization pulse whose magnitude is equal or substantially equal to the difference between the output voltage VOUT of the direct-current output DC and the magnitude of the input voltage VIN of the alternating-current power supply AC, divided by the turns-ratio Nboost between the boost inductor L1 and one of the first and second auxiliary windings L11 and L12.

When the current of the boost inductor L1 reaches zero, the current-sense signal detected by the current-sensing circuit 120 via the current-sense transformers CS1 and CS2 also reaches zero. When the control device 121 detects the current-sense signal reaching zero, the control device 121 turns off the freewheel switch (i.e., the first transistor Q1). Prior to the boost switch (i.e., the second transistor Q2) turning on, the boost-inductor voltage rings to a level that is close to the input voltage VIN of the alternating-current power supply AC, and the demagnetization pulse (i.e., the voltage in the second auxiliary winding L12) rings to zero or nearly zero. Preferably, the time delay until the time when the second transistor Q2 is turned back on is determined so that a minimal amount of ringing occurs when the boost switch (i.e., the second transistor Q2) is turned on. The control device 121 turns on the boost switch (i.e., the second transistor Q2) when the demagnetization pulse reaches a threshold voltage. The threshold voltage is preferably zero volts; however, a non-zero-voltage threshold voltage could also be used.

According to a preferred embodiment of the present invention, the time delay between the freewheel switch turning off and the boost switch turning on is computed by the control device(s) 111 and 121. According to another preferred embodiment of the present invention, the boost switch is simply turned on in response to the control device 111 detecting that the boost inductor L1 is demagnetized, such that the time delay only results from the inherent delays of the circuit components, such as propagation delays, switching delays, etc.

According to another preferred embodiment of the present invention, the control device(s) 111 and 121 instead determine(s) the time delay from a lookup table based on information including, for example, input voltage, output voltage, and load conditions.

After the time delay, the boost switch (i.e., the second transistor Q2) is turned on. This causes the current of the boost inductor L1 to increase, the voltage of the boost inductor L1 to remain constant or substantially constant at a voltage that is equal or substantially equal to the input voltage VIN of the alternating-current power supply AC, and the voltage of the demagnetization pulse (i.e., the voltage in the second auxiliary windings L12) to remain constant or substantially constant at approximately the instantaneous voltage of the alternating-current power supply AC divided by the turns ratio between the main windings of the boost inductor L1 and the first and second auxiliary windings L11 and L12. The on-time of the boost switch is determined by control device(s) 111 and 121, which provides a closed loop that regulates the direct-current output DC and the input current from the alternating-current power supply AC, and depends on the output power of the bridgeless PFC converter 100 and the magnitude of the voltage of the alternating-current power supply AC.

Next, the boost switch (i.e., the second transistor Q2) turns off, the freewheel switch (i.e., the first transistor Q1) turns on, and the above-described cycle repeats.

As shown in the second column of FIG. 5, similar waveforms result when the bridgeless PFC converter 100 operates during the negative half-cycle of the input voltage provided by the alternating-current power supply AC. As described above, the second transistor Q2 operates as the freewheel switch and the first transistor Q1 operates as the boost switch during the negative half-cycle of the input voltage provided by the alternating-current power supply AC. However, the current-sense signal and the demagnetization pulse have the same polarity regardless of the polarity of the input voltage provided by the alternating-current power supply AC.

The waveforms shown in FIG. 5 are for descriptive purposes only, and are not drawn to scale. Particularly, the time delay (between the freewheel switch turning off and the boost switch turning on) shown in FIG. 5 has been expanded to illustrate the waveforms of the voltage of the boost inductor L1 and the voltage of the demagnetization pulse (i.e., the voltage in the first and second auxiliary windings L11 and L12). Furthermore, the demagnetization pulse shown in FIG. 5 is an idealized pulse, and may instead asymptotically approach zero or ring about zero when the boost switch is turned on.

Figure 6:
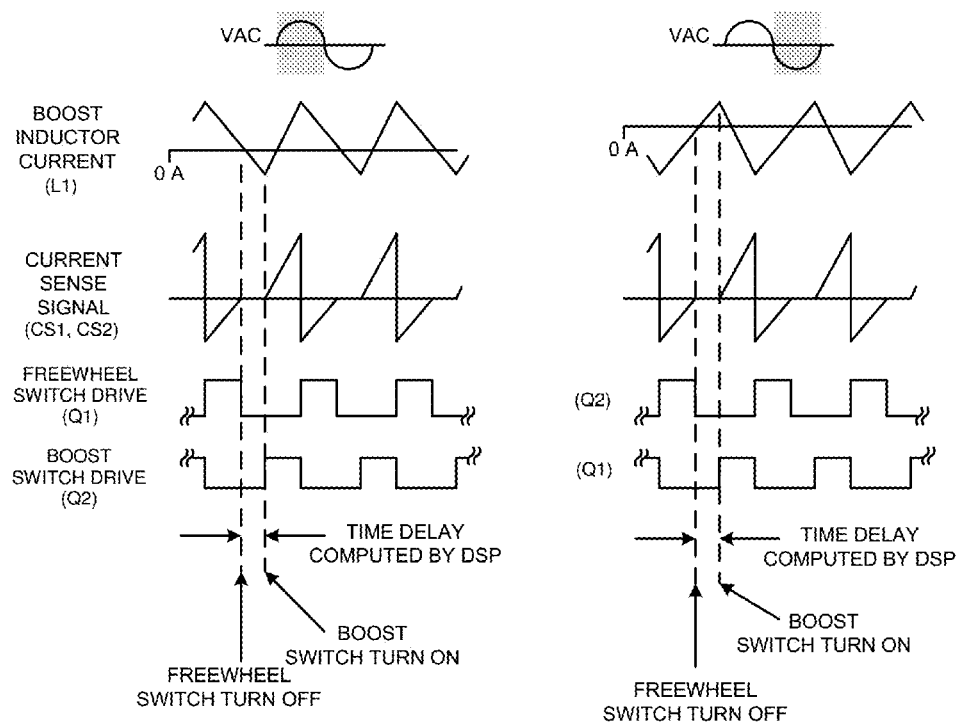
FIG. 6 shows waveforms associated with the bridgeless PFC converter shown in FIG. 2A and the current-sensing circuit shown in FIG. 4, in accordance with a second preferred embodiment of the present invention.

FIG. 6 shows waveforms associated with the bridgeless PFC converter 100 shown in FIG. 2A and the current-sensing circuit 120 shown in FIG. 4, in accordance with a second preferred embodiment of the present invention.

As shown in FIGS. 2A, 4, and 6, according to a second preferred embodiment of the present invention, the demagnetization-sensing circuit 110 of FIG. 3 may be omitted.

According to the first preferred embodiment of the present invention described above, the demagnetization of the boost inductor L1 is detected by the demagnetization pulse (i.e., the voltage in the first or second auxiliary windings L11 and L12). However, according to the second preferred embodiment of the present invention, the current-sense signal detected by the current-sensing circuit 120 via the current-sense transformers CS1 and CS2 may instead be used to determine when the boost inductor L1 is demagnetized.

For example, as shown in FIG. 6, the second preferred embodiment of the present invention relies on current information from the current-sense signal detected by the current-sensing circuit 120 to control the timing of both the boost and freewheel switches. More specifically, when the control device 121 of the current-sensing circuit 120 determines that the current of the boost inductor L1 has reached zero, the control device 121 turns off the freewheel switch. The control device 121 then determines a time delay and, after the time delay, controls the boost switch to turn on. The time delay is preferably determined by the control device 121 according to factors that include, for example, an ideal timing for the line conditions, load conditions, and output conditions.

The control device computes the time delay in real time or uses a look-up table to determine the time delay based on information including, for example, input voltage, output voltage, and load conditions.

According to the various preferred embodiments of the present invention, the demagnetization of a boost inductor in a bridgeless PFC converter is performed without requiring a resistor or other dissipative element to be arranged in series with the boost inductor. Thus, bridgeless PFC converters according to the various preferred embodiments of the present invention is able to operate in an efficient manner with minimal power loss for sensing and control, particularly at high levels of input voltage. Additionally, because the demagnetization sensing is not performed by a direct electrical and physical connection to the bridgeless PFC converter (i.e., only an inductance coupling or a calculation based on a sensed current is used), it is not necessary to include an isolation device at an input of the control device.

Although the preferred embodiments of the present invention are described herein with respect to an alternating-current input voltage, the preferred embodiments of the present invention are not limited thereto, and may also be applied to converters that include a direct-current input voltage, a half-wave alternating-current input voltage, etc. Furthermore, the preferred embodiments of the present invention are applicable to input voltages of either polarity.

Figure 7A:
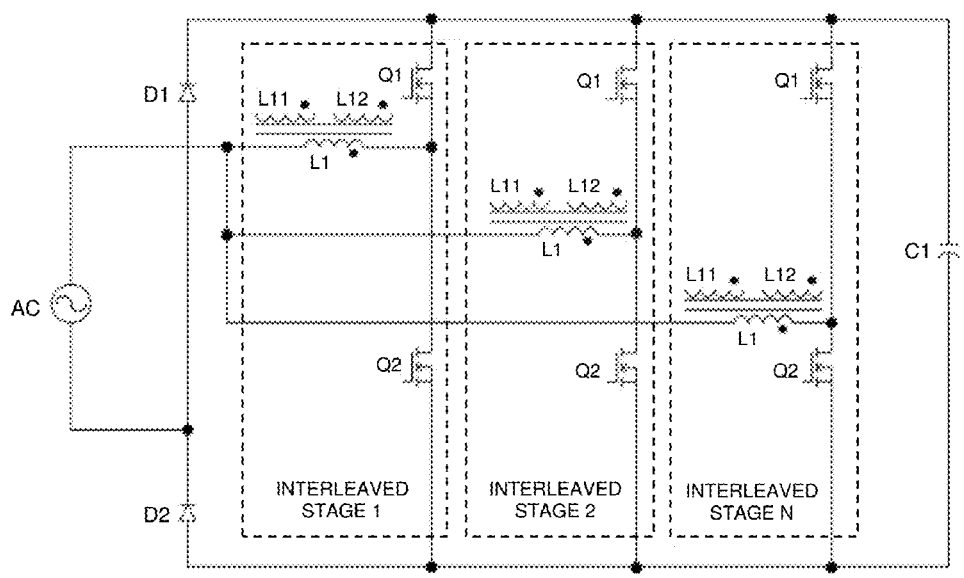
FIGS. 7A and 7B are circuit diagrams of the first preferred embodiment of the present invention implemented with an interleaved topology arrangement whereby additional power stages are added to increase available output power.
Figure 7B:
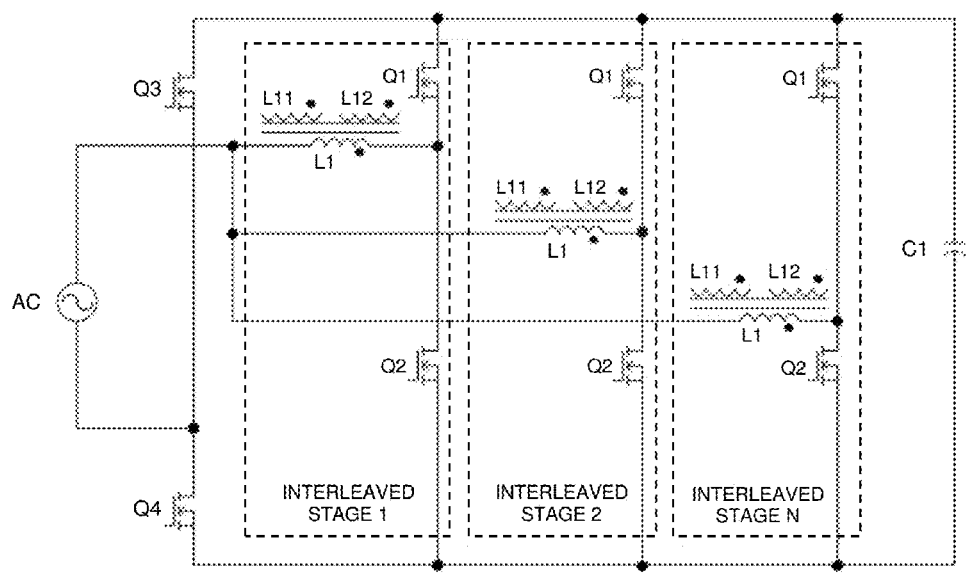

The preferred embodiments of the present invention are applicable to an interleaved topology that includes two or more stages of bridgeless PFC converters, to provide, for example, an increase in output power. Preferably, two or more stages of bridgeless PFC converters are connected in parallel, and the phases for switching the transistors of the two or more stages of bridgeless PFC converters are staggered. Preferably, a single controller is used to control all of the stages of bridgeless PFC converters. The N-stage interleaved topology shown in FIG. 7A corresponds to FIG. 2A in which first and second diodes D1 and D2 are used, while the N-stage interleaved topology shown in FIG. 7B corresponds to FIG. 2B in which third and fourth transistors Q3 and Q4 are used. The same reference numbers are used in FIGS. 7A and 7B as used in FIGS. 2A and 2B because the N-stage topologies of FIGS. 7A and 7B are similar to the single-stage topology of FIGS. 2A and 2B.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A bridgeless converter comprising:
a single boost inductor connected in series with an alternating-current power source;
a first series circuit including a first switching device and a second switching device connected in series with each other;
a second series circuit including a third switching device and a fourth switching device connected in series with each other;
a capacitor connected in parallel with the first series circuit and the second series circuit; and
a magnetization sensing circuit including:
first and second auxiliary windings inductively coupled to the single boost inductor and connected in series with each other;
first and second resistors connected in series with each other and connected between the first and second auxiliary windings;
a fifth switching device connected to the first auxiliary winding;
a sixth switching device connected to the second auxiliary winding; and
a voltage comparator including a first input connected to a point between the first and second resistors and a second input connected to a reference voltage.

2. The bridgeless converter according to claim 1, wherein the reference voltage is ground.

3. The bridgeless converter according to claim 1, further comprising a control device connected to an output of the voltage comparator.

4. The bridgeless converter according to claim 3, wherein the control device controls the first switching device and the second switching device according to the output of the voltage comparator.

5. The bridgeless converter according to claim 1, wherein the boost inductor is connected to the first series circuit at a point between the first and second switching devices.

6. The bridgeless converter according to claim 1, wherein the alternating-current power source is connected to the second series circuit at a point between the third and fourth switching devices.

7. The bridgeless converter according to claim 1, wherein each of the first switching device and the second switching device is a field effect transistor.

8. The bridgeless converter according to claim 1, wherein each of the third switching device and the fourth switching device is a diode.

9. The bridgeless converter according to claim 1, wherein each of the third switching device and the fourth switching device is a field effect transistor.

10. The bridgeless converter according to claim 1, further comprising a first current-sense transformer arranged to sense current in the first switching device and a second current-sense transformer arranged to sense current in the second switching device.

11. The bridgeless converter according to claim 10, further comprising a comparator circuit including a first input selectively connected to the first and second current-sense transformers and a second input connected to a reference voltage.

12. The bridgeless converter according to claim 11, wherein:
the first current-sense transformer is connected to the comparator circuit when the first switching device is in an ON state; and
the second current-sense transformer is connected to the comparator circuit when the second switching device is in an ON state.

13. The bridgeless converter according to claim 11, further comprising a control device connected to an output of the comparator circuit.

14. The bridgeless converter according to claim 13, wherein the control device is configured to control the first switching device and the second switching device according to an output of the first and second current sense transformers.

15. The bridgeless converter according to claim 11, further comprising a sense resistor connected between the first input of the comparator circuit and ground.

16. The bridgeless converter according to claim 1, wherein the fifth and sixth switches turn on and off in an alternating and complementary manner, according to zero crossings of the alternating-current power supply.

17. The bridgeless converter according to claim 1, wherein the magnetization sensing circuit provides a signal that indicates a magnetization state of the single boost inductor after current in the single boost inductor becomes zero.

* * * * *